United States Patent [19]

Marz

[11] 4,177,630
[45] Dec. 11, 1979

[54] SWEEP SECONDS TO JUMP SECONDS CONVERSION FOR CLOCKS

[75] Inventor: Frank H. Marz, Delavan, Wis.

[73] Assignee: Bunker Ramo Corporation, Oak Brook, Ill.

[21] Appl. No.: 845,018

[22] Filed: Oct. 25, 1977

[51] Int. Cl.² ............................................. G04B 13/00
[52] U.S. Cl. ........................................ 58/7; 58/23 D; 58/59
[58] Field of Search ............ 58/7, 9, 23 D, 75, 116 R, 58/59, 125 R, 125 B, 125 C, 126 D; 74/63, 128; 235/1 C, 61 A, 61 PA

[56] References Cited

U.S. PATENT DOCUMENTS

| | | | |
|---|---|---|---|
| 2,554,523 | 5/1951 | Clifford | 58/116 M |
| 3,388,605 | 4/1969 | Schafer | 58/116 R |
| 3,408,810 | 11/1968 | Meitinger | 58/125 R |
| 3,439,545 | 6/1969 | Siot | 58/116 R |
| 3,504,206 | 3/1970 | Fritsch | 58/116 R |
| 3,590,571 | 7/1971 | Niznik | 58/125 C |
| 3,783,608 | 1/1974 | Miyazawa | 58/116 R |
| 3,817,027 | 6/1974 | Wittner | 58/116 R |
| 3,922,848 | 12/1975 | Weber | 235/1 C |
| 3,934,404 | 1/1976 | Matsuura | 58/116 R |

Primary Examiner—Gene Z. Rubinson
Assistant Examiner—William L. Feeney
Attorney, Agent, or Firm—F. M. Arbuckle; G. D. Hosier

[57] ABSTRACT

A simplified, mechanical analog to digital converter mechanism useful in clocks or the like includes an impulse wheel periodically actuated by the continuous rotation of a conversion wheel coupled to a drive means such as a synchronous motor. The conversion wheel has a single tangential tang struck from its planar surface which functions on each wheel revolution to engage and advance a tooth of the impulse wheel one step. A uniform shaft rotation is thereby converted to a succession of digital steps, for example, a sweep seconds hand is converted to a jump seconds indicator.

12 Claims, 3 Drawing Figures

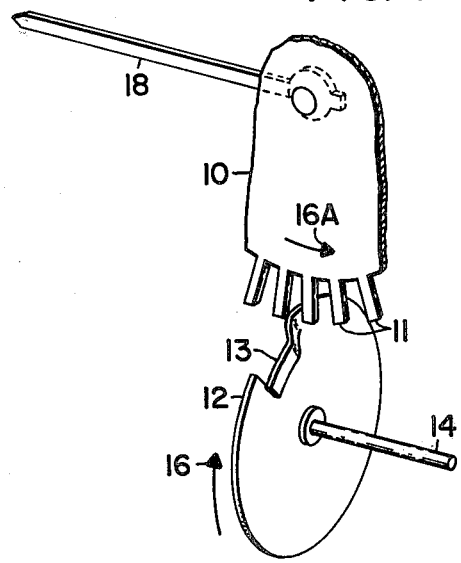
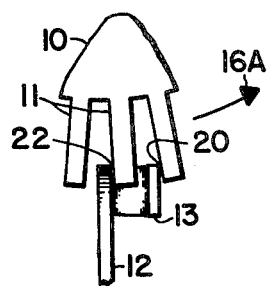
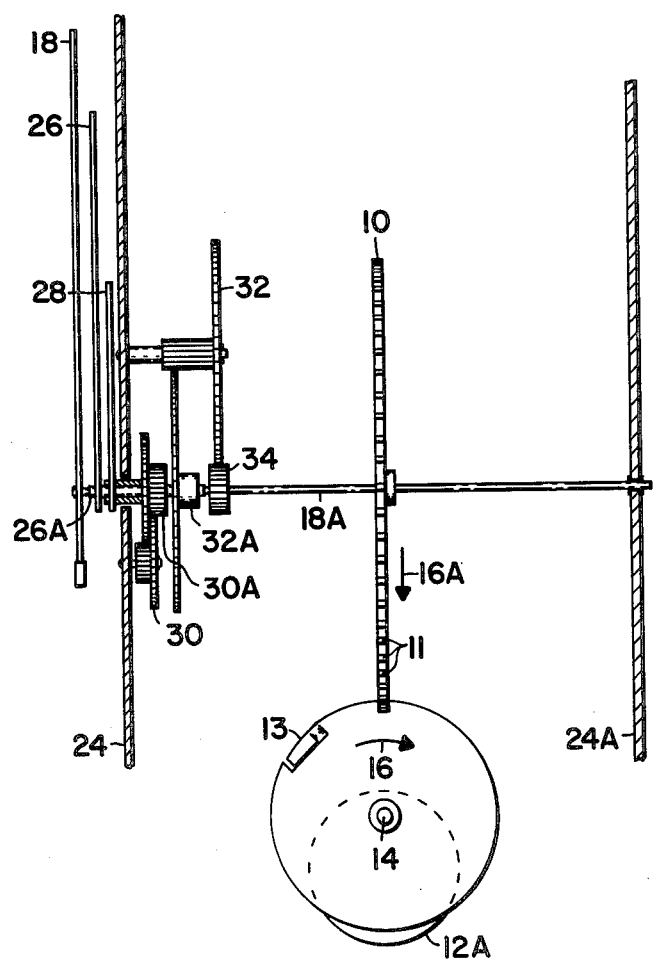

SWEEP SECONDS TO JUMP SECONDS CONVERSION FOR CLOCKS

BACKGROUND OF THE INVENTION

I. Field of the Invention

This invention relates generally to simplified mechanical analog to digital converter mechanisms and, more particularly, to mechanisms of the foregoing type which are useful, for example, in converting a sweep seconds indicator of a motor driven clock to a digital or jump seconds indicator.

II. Description of the Prior Art

Centuries of research in the horological art has resulted in the development of a myriad of different kinds and types of clock movements and time indicator mechanisms. As is evident from the prior art accumulated in the PRIOR ART STATEMENT submitted with this application, various means have been used in clock mechanisms to attain both a smooth rotational advancement of the second hand and an accurate dead-beat or jump seconds indication. For example U.S. Pat. No. 3,408,810 issued Nov. 5, 1968 to Heinz Meitinger describes a jump second drive means incorporated into a pin pallet watch escapement wherein the drive to the seconds wheel is indexed in a manner such that the seconds hand is driven forward a discrete step for each passing second. U.S. Pat. No. 3,590,571 issued July 6, 1971 to Emil J. Niznik and assigned to the same assignee as the present invention discloses a digital clock in which the seconds hand and a conventional escapement are driven by a spring which is periodically wound by a motor that is momentarily energized to advance the minute drum and the hour drum.

Typically, the prior art is concerned with the development of either a jump or sweep seconds indication and the mechanism is constructed specifically to achieve such end. There is need, however, for a reliable and simplified mechanism for converting an analog output such as might be used to drive a sweep seconds hand, to a digital or jump seconds indicator. Such a mechanism would have utility not only in clocks but in other environments where a continuous or analog drive is desired to derive a preset number of digitized steps per unit time.

SUMMARY OF THE INVENTION

Accordingly, one aspect of this invention is directed to an improved and simplified analog to digital timing mechanism.

Another aspect of the present invention is directed to providing a jump seconds indicator in a clock mechanism driven by a synchronous motor or similar analog drive.

Accordingly, the present invention is directed to a mechanical analog to digital converter for changing the uniform rotation of a mechanical driving element, such as the synchronous motor of an AC clock, to a sequence of digital steps, such as the jump seconds indicator on a clock face. Specifically, the converter includes an impulse wheel means including a plurality of cog teeth disposed at predetermined angular intervals about the perimeter of the wheel, the impulse wheel being adapted for incremental angular movement about a central axis with the stepped angular displacement of the cog teeth. A conversion wheel means is coupled to the driving element and comprises a rotatable member having a cam element for engaging and rotating one of the cog teeth through a predetermined angular displacement and for effectively blocking rotation of the one tooth beyond a predetermined angular interval. A digital output means, such as the seconds hand of a clock, is coupled to the impulse wheel for developing a stepped, digital movement proportional to the uniform rate of rotation of the driving element.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, in the several figures of which like reference numerals identify like elements, and in which:

FIG. 1 is a semi-schematic perspective illustration of a fragment of the impulse wheel and illustrating its relation to the conversion wheel in the analog to digital converter of the present invention;

FIG. 2 is a detail view depicting the inter-relation of the cog teeth of the impulse wheel and the tang of the conversion wheel during an indexing step; and FIG. 3 is a side elevational view of the works of a conventional electric clock embodying the analog to digital converter apparatus of the present invention.

DESCRIPTION OF THE PREFERRED EMBODIMENTS

Referring initially to FIG. 1, the principal mechanical components of the analog to digital converter mechanism of the present invention are depicted in a semi-schematic form for clarity of illustration. The converter comprises an impulse wheel means 10 including a plurality of cog teeth 11 disposed at predetermined angular intervals about the perimeter of the wheel 10. Only a fragmental section of the disc-shaped impulse wheel 10 is illustrated in FIG. 1 for the sake of clarity but it is to be understood that the remaining arcuate segment of the wheel 10 may be constructed in a similar fashion to that illustrated.

The central axis of the impulse wheel 10 is disposed so as to lie transverse to the axis 14 of a conversion wheel means 12 that likewise may be formed from a disc of metal or similar material. A tang 13 is struck out of the perimeter portion of the disc 12 to define an initially ramped cam surface portion disposed at approximately a 30° angle to the plane of the disc 12. The terminal portion of the tang 13 is formed as shown to lie in a plane parallel to the surface of the disc 12. Although only one such tang 13 is shown struck from the disc 12, it will be understood that the number and angular disposition of the tangs 13 on disc 12 as well as the number and spacing of the cog teeth 11 on the disc 10 may be varied to accomplish any of a variety of linear or nonlinear digital characteristics.

The discs or wheels 10, 12 in addition to being mounted on rotational axes at right angles to one another also are disposed such that the tang 13 engages a single cog tooth 11 during each cycle of rotation. In this regards, the converter further includes a digital output means, in the present case a jump seconds indicator 18 disposed for rotation about the axis of the disc 10 for developing a stepped, digital movement proportional to the uniform rate of rotation of the driving element coupled to the shaft 14 of the conversion wheel 12.

Rotation of the conversion wheel axis 14 from an analog drive source such as a synchronous motor (not shown) results in rotation of the conversion wheel 12 in the direction of the arrow 16 which, through the engagement of tang 13 with the associated cog teeth 11, causes a stepped movement of impulse wheel 10 in the direction of arrow 16a. Correspondingly, the indicator arm 18 secured to the central axis of impulse wheel 10 moves in a rotational path in a series of sequential steps per revolution corresponding in number to the cog teeth 11.

The detailed view of FIG. 2 illustrates the impulse wheel 10 in correct mesh with the conversion wheel 12. In this Figure, a positive indexing and safety latching feature of the invention may be conveniently visualized. Specifically, as the initial ramped portion of the tang 13 indexes the right-most tooth 11 of the wheel 10 along the arcuate path via arrow 16a, a successive tooth 11 is displaced a sufficient distance so as to be disposed on the right-hand side of the conversion wheel 12. Further rotational movement of the second cog tooth 11 in the direction of the arrow 16a is precluded by the abutment surface defined by the planar back side of the tang 13. On the other hand, once the conversion wheel 12 has rotated beyond the tang 13 the second cog tooth 11 is pre-indexed to a position such that the second and third cog teeth 11 shown in FIG. 2 in fact straddle the opposite sides of the wheel 12 and are secured against significant, inadvertent angular movement as may be caused by an extraneous shock force. The cog-like construction of the teeth 11 assures a positive indexing of the gear wheels without the necessity to maintain critical tolerances. Additionally, the specific constructions illustrated facilitate an economical manufacture of the components 10 and 11 by known metal stamping techniques.

Referring now to FIG. 3, the analog to digital converter mechanism of the present invention is shown incorporated into an otherwise conventional electric clock to provide a jump seconds indicator. A conventional synchronous motor 12a rotates the axle 14 of conversion wheel 12 at a rate of one revolution per second. The conversion wheel is shown in mesh with the impulse wheel 10 which is angularly stepped in six degree increments at a like rate of one RPM. The impulse wheel 10 is secured to the center shaft of the axle 18a which drives the jump seconds hand 18. A pinion 34 likewise fixedly mounted to the axle 18 is one element of a pair of motion trains which effect a coordinated driving of the minute and hour hands of the clock. The motion train 32 has a conventional gear reduction ratio of 60 to 1 and drives the minute sleeve 26a and minute hand 26 through a collet clutch 32a. The minute hand sleeve 26a is attached in known manner to a 12 minutes:1 gear ratio motion train 30 which drives an hour hand 28. The clock mechanism is supported between a front plate 24 and a back plate 24a shown in schematic form in the drawing. Supporting pillars and other ancillary structural details familiar to conventional AC clocks are omitted from the drawing for convenience and clarity.

It will be understood that prudent selection of the materials for fabrication of the impulse wheel 10 and the conversion wheel 12 will not only facilitate economical manufacture as earlier stated but will also allow the clock to run nearly silently and without the necessity for frequent lubrication. To this end, the impulse wheel 10 including its sixty cog teeth 11 may (preferably) be injection molded or machined from some low friction yet durable plastic such as Teflon. The conversion wheel 12 may be made for example of an 18 gauge hard brass or phosphor bronze. Alternatively, wheels 10, 12 may be stamped from metal sheet material.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. In a timing mechanism for a clock, a jump seconds indicator comprising an impulse wheel having a plurality of teeth, and drive means coupled to said impulse wheel for advancing said impulse wheel, said drive means comprising a conversion wheel having means located thereon for advancing said impulse wheel by both indexing one tooth of said plurality of teeth by contact therewith and engaging the next adjacent tooth of said plurality of teeth prior to indexing it, and means for substantially uniformly and unidirectionally rotating said conversion wheel.

2. The mechanism of claim 1 wherein said impulse wheel has 60 teeth.

3. The mechanism of claim 2 wherein each of said 60 teeth has a rectangular cog-shaped configuration.

4. The mechanism of claim 2 wherein said drive means advances said impulse wheel six degrees per second.

5. The mechanism of claim 1 wherein said means located on said conversion wheel comprises at least one tangential tang member.

6. The mechanism of claim 5 wherein said conversion wheel comprises a planar metal disc and in which said tangential tang member is struck out of said disc.

7. The mechanism of claim 6 wherein said tangential tang member has a free end portion and an opposite end portion connected to said conversion wheel.

8. The mechanism of claim 7 wherein said free end portion of said tang member is spaced from the planar surface of said metal disc at a predetermined distance for indexing one tooth of said plurality of teeth through a predetermined rotational distance and for engaging the next adjacent tooth for positively preventing further rotation of said impulse wheel.

9. A clock mechanism comprising, in combination, a seconds hand, a jump seconds indicator comprising an impulse wheel having a plurality of teeth and a shaft, said shaft being connected to said seconds hand, a minute hand and an hour hand, gear means connected to said shaft and to said minute hand and said hour hand for moving said minute hand one minute during the period of time of one minute and for moving said hour hand one hour during the period of time of one hour, drive means coupled to said impulse wheel for advancing said impulse wheel, said drive means comprising a conversion wheel having means located thereon for advancing said impulse wheel by both indexing one tooth of said plurality of teeth by contact therewith and engaging the next adjacent tooth of said plurality of teeth prior to indexing it, and means for substantially uniformly and unidirectionally rotating said conversion wheel.

10. The mechanism of claim 9 wherein said free end portion of said tang member is spaced from the surface of said conversion wheel at a distance to permit indexing of said one tooth of said plurality of teeth and contact with said next adjacent tooth to position it for indexing by said tang member on a successive revolution thereof.

11. A clock mechanism comprising, in combination, a seconds hand, a jump seconds indicator comprising an impulse wheel having a plurality of teeth and a shaft, said shaft being connected to said seconds hand, a minute hand and an hour hand, gear means connected to said shaft and to said minute hand and said hour hand for moving said minute hand one minute during the period of time of one minute and for moving said hour hand one hour during the period of time of one hour, drive means coupled to said impulse wheel for advancing said impulse wheel, said drive means comprising a conversion wheel having means located thereon for advancing said impulse wheel by both indexing one tooth of said plurality of teeth by contact therewith and engaging the next adjacent tooth of said plurality of teeth prior to indexing it, said impulse wheel having 60 teeth, each of said 60 teeth having a rectangular cog-shaped configuration, said drive means advancing said impulse wheel six degrees per second, said means located on the outer portion of said conversion wheel, said tangential tang member having a free end portion and a portion connected to said conversion wheel, said free end portion of said tangential tang member being spaced from the surface of said conversion wheel at a distance to permit indexing of said one tooth of said plurality of teeth and contact with said next adjacent tooth, and means for substantially uniformly and unidirectionally rotating said conversion wheel.

12. A mechanical analog to digital converter for changing the uniform rotation of a mechanical driving element to a sequence of digital steps, comprising:
    impulse wheel means including a plurality of teeth disposed at predetermined angular intervals about the perimeter of said wheel, said wheel means adapted for incremental angular movement about a central axis with stepped angular displacement of said teeth;
    conversion wheel means, coupled to said driving element for uniform rotation therewith, comprising a rotatable member having a cam element for engaging and rotating one of said teeth through a predetermined angular displacement and for effectively blocking rotation of said one tooth beyond a predetermined angular interval; and
    digital output means coupled to said impulse wheel means for developing a stepped, digital movement proportional to the uniform rate of rotation of said driving element.

* * * * *